United States Patent
Carroll et al.

(10) Patent No.: US 6,561,308 B1
(45) Date of Patent: May 13, 2003

(54) METHOD OF MONITORING AND DEACTIVATING A STEER-BY-WIRE SYSTEM

(75) Inventors: Deanna Carroll, Westland, MI (US); Bing Zheng, Dublin, OH (US); M. Yi-Yang Huang, Troy, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/998,087

(22) Filed: Nov. 30, 2001

(51) Int. Cl.7 .................................................. B62D 5/04
(52) U.S. Cl. ........................ 180/446; 180/444; 180/443
(58) Field of Search .............................. 180/402, 446, 180/443, 444; 701/43, 41

(56) References Cited

U.S. PATENT DOCUMENTS

| | | | |
|---|---|---|---|
| 4,934,474 A | * 6/1990 | Sugasawa | .................. 180/140 |
| 5,136,507 A | * 8/1992 | Shiraishi et al. | ....... 364/424.05 |
| 6,059,068 A | 5/2000 | Kato et al. | |
| 6,097,286 A | * 8/2000 | Discenzo | .................... 340/465 |
| 6,098,296 A | * 8/2000 | Perisho, Jr. et al. | .......... 33/203 |
| 6,176,341 B1 | 1/2001 | Ansari | |
| 6,208,923 B1 | 3/2001 | Hommel | |
| 6,244,371 B1 | 6/2001 | Bohner et al. | |

\* cited by examiner

*Primary Examiner*—Lesley D. Morris
*Assistant Examiner*—Tony H. Winner
(74) *Attorney, Agent, or Firm*—Brinks Hofer Gilson & Lione

(57) ABSTRACT

A method of monitoring and deactivating a steer-by-wire system capable of several performance levels of a vehicle, including measuring an angle of an actuated road wheel of the vehicle, a steering angle of a steering device of the vehicle, and a velocity of the vehicle; determining and storing an acceptable angle range based on the measured steering angle of the steering device and the measured velocity; comparing the measured angle of the actuated road wheel to the acceptable angle range; and implementing a procedure based on the comparison of the measured angle to the acceptable angle range that complies with a particular set of rules.

17 Claims, 2 Drawing Sheets

METHOD OF MONITORING AND DEACTIVATING A STEER-BY-WIRE SYSTEM

TECHNICAL FIELD

This invention relates generally to monitoring systems for steer-by-wire systems.

BACKGROUND

Consumer demand for lighter weight, more fuel-efficient vehicles coupled with major advances in technology has resulted in the advent of the steer-by-wire system. The steer-by-wire system is able to reduce weight by eliminating the large mechanical linkage associated with conventional steering systems. The steer-by-wire system uses actuators connected to both the wheels of the vehicle and a control unit to turn the wheels and control the angle to which they are turned. While the steer-by-wire system has been successful in reducing the weight of vehicles and, therefore, contributing to greater fuel efficiency, it has also raised concerns about steering accuracy.

Whereas conventional steering systems use a mechanical linkage to connect the steering wheel to the road wheels, the steer-by-wire system uses no such device. Much of the concern related to the use of steer-by-wire systems stems from the fact that the system uses no mechanical linkage. A major concern is that the electrical connection used by the steer-by-wire system will result in reduced steering accuracy and the driver of the vehicle will receive no warning of such accuracy reduction.

In light of the concerns discussed above, a monitoring and deactivating system for a steer-by-wire system of a vehicle is needed.

DETAILED DESCRIPTION

The following description of the preferred embodiment of the invention and the preferred method of using the invention are not intended to limit the scope of this invention to this preferred embodiment and method, but rather to enable any person skilled in the art of steer-by-wire systems to make and use the invention.

Figure 1:
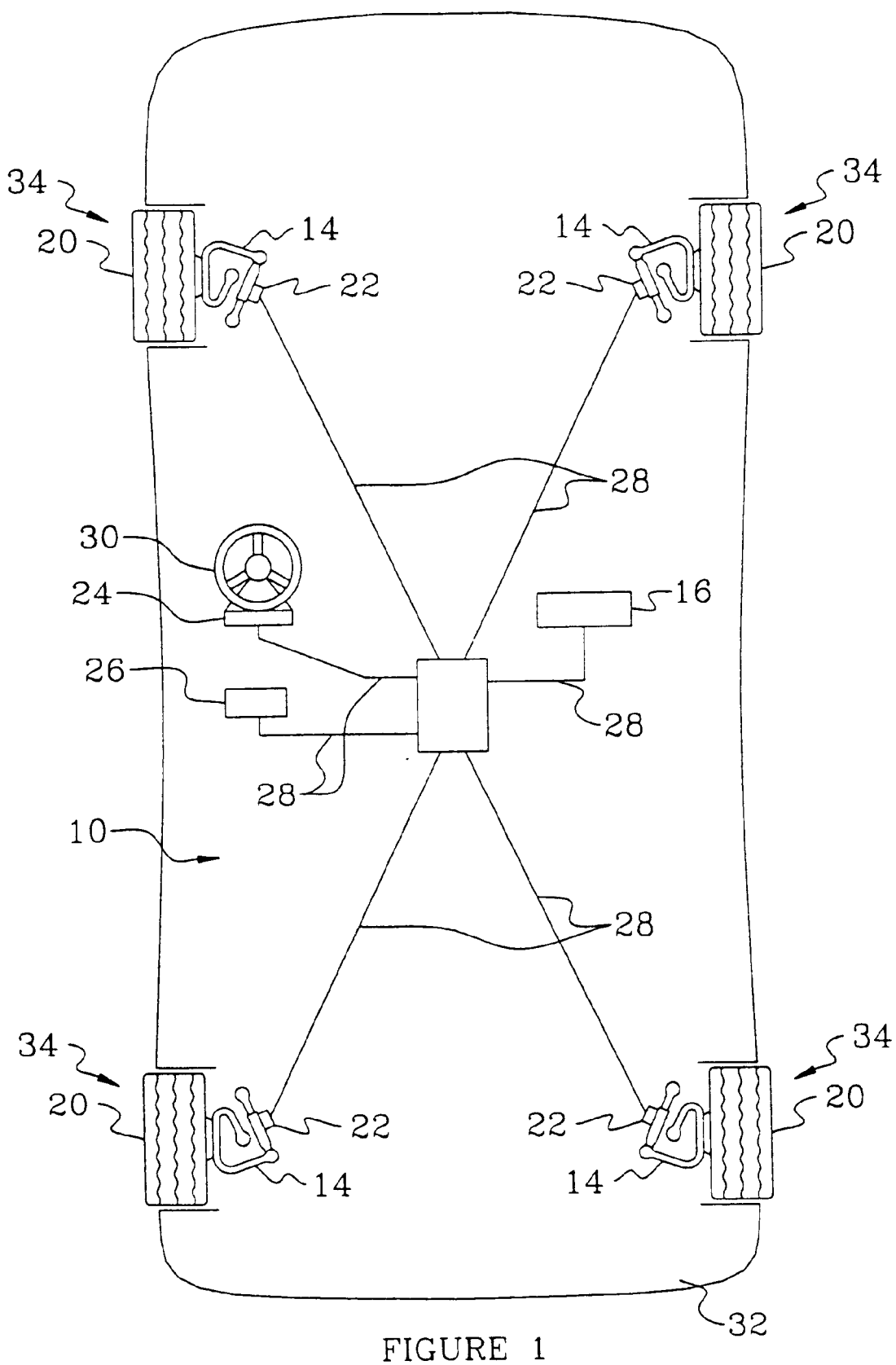
FIG. 1 is a top view schematic of a monitoring system for a steer-by-wire system.

As shown in FIG. 1, the invention is a monitoring and deactivating system 10 for a steer-by-wire system of a vehicle 32, which includes a sensor subsystem 12, an actuated road wheel 34, a warning system 16, and a controller 18. The monitoring and deactivating system 10 is capable of monitoring an angle of the actuated road wheel 34 and reducing or increasing performance of a steer-by-wire system of the vehicle 32 when appropriate. In addition, the monitoring and deactivating system 10 is capable of warning a driver of the changes in performance of the steer-by-wire system.

The sensor subsystem of the preferred embodiment 12 includes a road wheel sensor 22, a steering device sensor 24, and a velocity sensor 26. The purpose of the road wheel sensor 22 is to measure the angle to which the road wheel 20 is turned. Preferably, the road wheel sensor 22 is a conventional sensor. Alternatively, any suitable device capable of measuring the angle of the road wheel 20 and transmitting that information may be used. The purpose of the steering device sensor 24 is to measure the steering angle of a steering device 30. Preferably, the steering device 30 is a conventional steering wheel and the steering device sensor 24 is a conventional sensor. Alternatively, a joystick, a touch pad, a track ball, or any other suitable steering device may be used. Further, any suitable device capable of measuring the steering angle of the steering device 30 and transferring that information to a controller 18 may be used as the steering device sensor 24. The purpose of the velocity sensor 26 is to measure the velocity of the vehicle 32. Preferably, the velocity sensor 26 is a conventional sensor. Alternatively, any suitable device capable of measuring the velocity of the vehicle 32 and transferring that information to the controller 18 may be used. In the preferred embodiment, as shown in FIG. 1, the velocity sensor 26 is coupled to the controller 18 by wiring 28. However, as discussed above, the connection depends on the type of controller 18 and velocity sensor 26 being used. Alternatively, the velocity sensor 26 may be coupled to the controller 18 by infrared means, radio means, or any other suitable means of transferring information from the velocity sensor 26 to the controller 18.

The actuated road wheel 34 of the preferred embodiment includes an actuator 14 and a road wheel 20. The purpose of the actuator 14 is to turn the road wheel 20 and the purpose of the road wheel 20 is to direct the vehicle 32. Preferably, the actuator 14 is a conventional electrical power-assisted steering mechanism connected to the road wheel 20 through conventional electric motors and conventional rack and pinion subsystems. Alternatively, any other suitable device capable of independently turning the road wheel 20 may be used. The road wheel 20 is preferably a conventional road wheel, but any other suitable device capable of directing the vehicle 32 may be used.

The purpose of the warning system 16 of the preferred embodiment is to, upon activation of the system, provide warning to a driver of the vehicle 32 that the performance of the steer-by-wire system has been or will be reduced. Similarly, the warning system 16 may be used to warn the driver of the vehicle 32 that the performance of the steer-by-wire system has been or will be increased. Activation of the warning system 16 preferably includes a transmission of audio and visual signals. Alternatively, any signal that is capable of adequately warning the driver of a change in performance of the steer-by-wire system may be used.

The purpose of the controller 18 is to control the actuator 14 of the actuated road wheel 34 based on input from the sensor subsystem 12 and to activate the warning system 16 accordingly. The controller 18 is preferably a conventional controller containing, among other things, a processor and a memory bank. Alternatively, any other suitable device capable of controlling the actuator 14 and warning system 16 based on input received from the sensor subsystem 12 may be used. As discussed above, the controller 18 is connected to the road wheel sensor 22, the steering device sensor 24, the velocity sensor 26, the actuator 14, and the warning system 16 by wiring 28. Alternatively, the controller 18 may be coupled to the road wheel sensor 22, the steering device sensor 24, the velocity sensor 26, the actuator 14, and the warning system 16 by infrared means, radio means, or any other suitable means of transferring information from the sensors to the controller 18 and from the controller 18 to the warning system 16 and the actuator 14.

Figure 2:
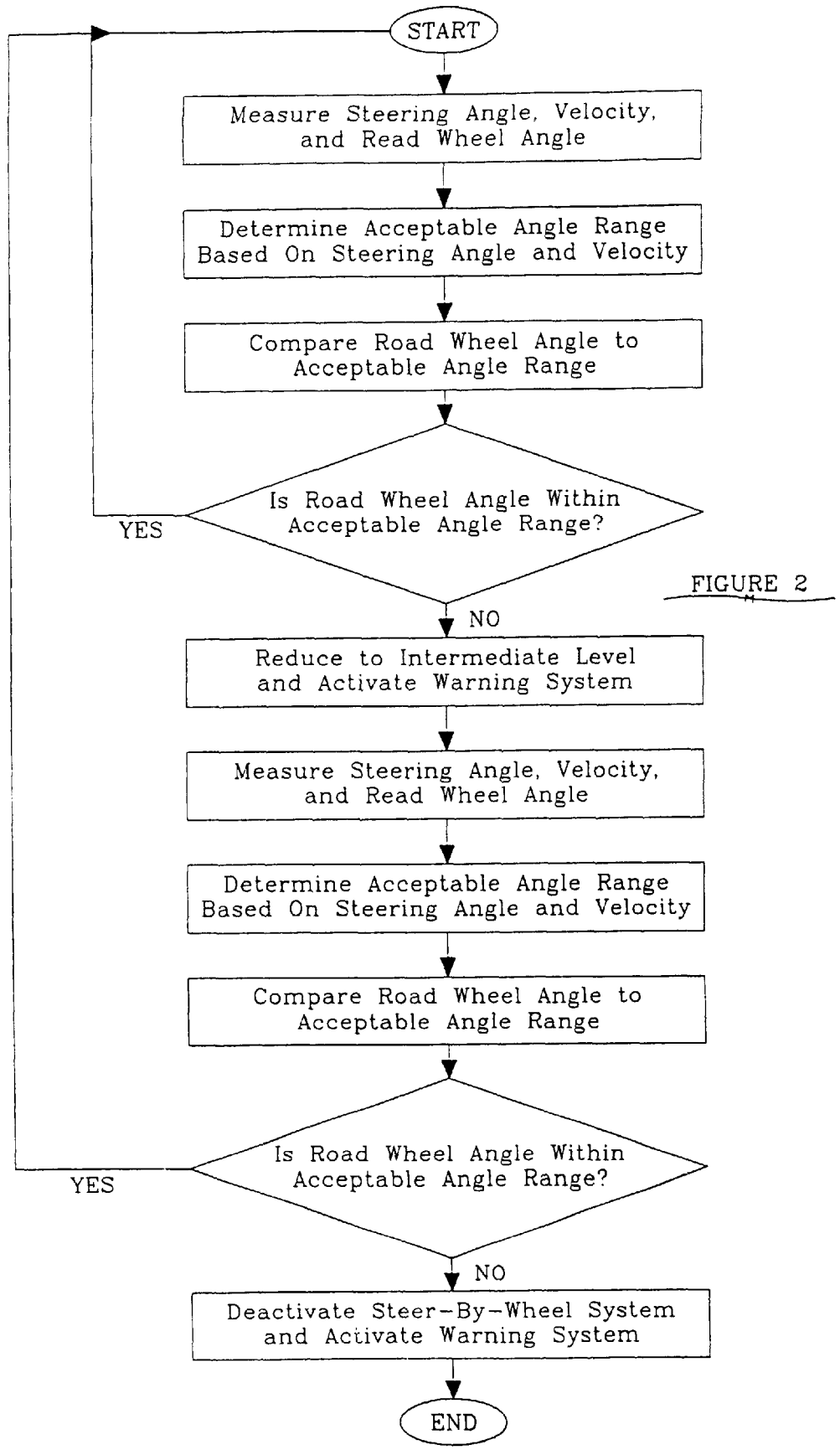
FIG. 2 is a flow chart of a method for monitoring and deactivating a steer-by-wire system.

As illustrated in FIG. 2, the preferred method of using the present invention involves: measuring the angle of the road wheel 20, the steering angle of the steering device 30, and the velocity of the vehicle 32; determining an acceptable angle range; comparing the measured angle of the road wheel 20 to the acceptable angle range; and reducing or increasing the performance of the steer-by-wire system and activating a warning system 16 based on the above comparison when appropriate.

The angle of the road wheel 20, the steering angle of the steering device 30, and the velocity of the vehicle 32 are measured using the road wheel sensor 22, the steering device sensor 24, and the velocity sensor 26, respectively, as discussed above, and that information may be transmitted to the controller 18 via wiring 28.

The acceptable angle range is determined by the controller 18 based on the measured steering angle of the steering device 30 and velocity of the vehicle 32. Based on this information, the controller 18 is able to calculate a theoretical maximum acceptable angle for the road wheel 20 and a theoretical minimum acceptable angle for the road wheel 20. Angles less than or equal to the theoretical maximum angle and greater than or equal to the theoretical minimum angle constitute the acceptable angle range. The velocity of the vehicle 32 is used since acceptable angle differences at parking speeds could be less safe at highway speeds, and since the high degree of accuracy required at highway speeds might not be available at parking speeds due to environmental factors. Preferably, the acceptable angle range associated with various velocities and steering angles is stored within the memory bank of the controller 18 as a look-up table. Alternatively, the controller 18 may calculate the acceptable angle range as input is received from the sensor subsystem 12 or the controller 18 may use any other suitable method for determining the acceptable angle range.

Once input has been received from the sensor subsystem 12 and the controller 18 has determined the acceptable angle range, the controller 18 then compares the measured angle of the road wheel 20 to the acceptable angle range. The processor within the controller 18 preferably carries out this comparison, but any other suitable device capable of comparing the measured angle of the road wheel 20 to the acceptable angle range may be used. If the measured angle of the road wheel is outside the acceptable range, then the system gradually reduces the actuation range of the road wheel 34 (the "performance") of the steer-by-wire system, which allows the system and/or the driver to recover from the situation as discussed below.

Depending on the results of the comparison discussed above, the performance of the steer-by-wire system may be reduced, increased, or maintained. There are preferably four levels of performance at which the steer-by-wire system can operate: a full performance level, two intermediate performance levels, and a lowest performance level. Alternatively, any suitable number of performance levels may be used. The preferred performance levels are as follows: the full performance level includes an activation range; a first intermediate performance level includes 90% of the activation range; a second intermediate performance level includes 50% of the activation range; and the lowest performance level includes 0% of the activation range. Alternatively, any other suitable levels of performance may be used.

The controller 18 uses input data from the steering device sensor 24 and the road wheel sensor 22 to choose a proper level of performance. For every steering angle of the steering device 30 of a steer-by-wire system at full performance there is a corresponding desired angle of the road wheel 20. When the steer-by-wire system is at the full performance level, the controller 18 receives input from the steering device sensor 24 regarding the steering angle and it outputs a command to the actuator 14 to turn the road wheel 20 to the corresponding desired angle. However, when the steer-by-wire system is not at the full performance level, the upper limit of the requested actuation is reduced or "truncated" from the full activation range or capability. For example, the controller 18 of the steer-by-wire system at the first intermediate lever (90%) may request an actuation requiring the full actuator capability corresponding to a command current of 100 Amps, but will only receive actuation corresponding to a command current of 90 Amps. On the other hand, at the same performance level, the controller may request an actuation requiring less than the full actuator capability, for example a command current of 60 Amps, and will receive actuation corresponding to a command current of 60 Amps.

If the measured angle of the road wheel 20 of the steer-by-wire system at the full performance level is within the acceptable angle range, then the steer-by-wire system remains at the full performance level. However, if the measured angle at the full performance level is outside the acceptable angle range, then the warning system 16 is activated and the performance level is reduced to an intermediate performance level.

If the measured angle of the road wheel 20 of the steer-by-wire system at the intermediate performance level is within the acceptable angle range, then the performance is increased to a higher performance level. For example, a steer-by-wire system at the lower intermediate performance level would be increased to the higher intermediate performance level, whereas a steer-by-wire system at the higher intermediate performance level would be increased to the full performance level. However, if the measured angle at the intermediate performance level is outside the acceptable angle range, then the warning system 16 is activated and the performance level is reduced to a lower performance level. For example, a steer-by-wire system at the higher intermediate performance level would be reduced to the lower intermediate performance level, whereas a steer-by-wire system at the lower intermediate performance level would be reduced to the lowest performance level.

If the performance of the steer-by-wire system is reduced to the lowest performance level, the warning system 16 is activated and the transmission of signals from the controller 18 to the actuator 14 ceases, which completely deactivates the steer-by-wire system. Restarting the vehicle 32 preferably reactivates the steer-by-wire system. Upon starting the vehicle, the steer-by-wire system is reset to full performance and monitoring of the steer-by-wire system is continued in the same manner as previously discussed.

The method and apparatus discussed above is preferably adapted to monitor and deactivate one, two, three, or four actuated road wheels 34. Alternatively, the method and apparatus for monitoring and deactivating the steer-by-wire system may be adapted to be used with vehicles having any number of actuated road wheels 34.

As any person skilled in the art of steer-by-wire systems will recognize from the previous detailed description and from the figures and claims, modifications and changes can be made to the preferred embodiment of the invention without departing from the scope of this invention defined in the following claims.

We claim:

1. A method of monitoring and deactivating a steer-by-wire system capable of several performance levels of a vehicle, comprising:

measuring an angle of an actuated road wheel of the vehicle, a steering angle of a steering device of the vehicle, and a velocity of the vehicle;

determining and storing an acceptable angle range based on the measured steering angle of the steering device and the measured velocity;

comparing the measured angle of the actuated road wheel to the acceptable angle range; and implementing a procedure based on the comparison of the measured angle to the acceptable angle range that complies with the following rules:

(i.) if the measured angle of the steer-by-wire system at a full performance level is within the acceptable angle range, then maintain a full performance level, but if the measured angle is outside the acceptable angle range, then activate a warning system and reduce the performance of the steer-by-wire system to an intermediate performance level;

(ii.) if the measured angle at the intermediate performance level is outside the acceptable angle range, then activate a warning system and reduce the performance of the steer-by-wire system to a lower performance level; and (iii.) if the steer-by-wire system is reduced to a lowest performance level, then activate a warning system and completely deactivate the steer-by-wire system.

2. A method as claimed in claim 1, wherein there is one full performance level, one higher intermediate performance level, one lower intermediate performance level, and one lowest performance level.

3. A method as claimed in claim 2, wherein said full performance level includes an activation range, said higher intermediate performance level includes approximately 90% of the activation range, said lower intermediate performance level includes approximately 50% of the activation range, and said lowest performance level includes approximately 0% of the activation range.

4. A method as claimed in claim 1, wherein the time required for the monitor to reduce performance is proportional to the severity of the difference between the measured angle and the acceptable angle range.

5. A method as claimed in claim 1, wherein if the measured angle of the actuated road wheel of the steer-by-wire system at the intermediate performance level is within the acceptable angle range, then the steer-by-wire system is increased to a higher performance level.

6. A method as claimed in claim 1, wherein, after the steer-by-wire system has been completely deactivated, full performance of the steer-by-wire system may be restored upon restarting the vehicle.

7. A method as claimed in claim 1, further comprising measuring and comparing an angle of a second actuated road wheel.

8. A method as claimed in claim 7, further comprising measuring and comparing an angle of a third actuated road wheel.

9. A method as claimed in claim 8, further comprising measuring and comparing an angle of a fourth actuated road wheel.

10. A monitoring and deactivating system for a steer-by-wire system capable of several performance levels of a vehicle, comprising:

a road wheel sensor to measure an angle of an actuated road wheel of the vehicle, a steering device sensor to measure a steering angle of a steering device of the vehicle, and a velocity sensor to measure a velocity of the vehicle;

a controller coupled to the road wheel sensor, the steering device sensor, the velocity sensor, an actuator of the actuated road wheel, and a warning system to determine an acceptable angle range, to compare a measured angle of the actuated road wheel to the acceptable angle range, and to control the actuator and the warning system in compliance with the following rules:

(i.) if the measured angle of the steer-by-wire system at a full performance level is within the acceptable angle range, then said controller transmits a signal to the actuator to maintain a full performance level, but if the measured angle is outside the acceptable angle range, then said controller transmits a signal to activate the warning system and said controller transmits a signal to the actuator to reduce the performance of the steer-by-wire system to an intermediate performance level;

(ii.) if the measured angle at the intermediate performance level is outside the acceptable angle range, then said controller transmits a signal to activate the warning system and said controller transmits a signal to the actuator to reduce the performance of the steer-by-wire system to a lower performance level; and (iii.) if the steer-by-wire system is reduced to a lowest performance level, then said controller sends a signal to activate the warning system and said controller ceases transmission of signals to the actuator, thereby deactivating the steer-by-wire system.

11. An apparatus as claimed in claim 10, wherein said controller increases the performance to a higher performance level if the measured angle of the actuated road wheel of the steer-by-wire system at the intermediate performance level is within the acceptable angle range.

12. An apparatus as claimed in claim 10, wherein, after the steer-by-wire system has been completely deactivated, the controller may restore the steer-by-wire system to full performance upon restarting of the vehicle.

13. An apparatus as claimed in claim 10, further comprising a second road wheel sensor to measure an angle of a second actuated road wheel, wherein said controller is coupled to said sensor and an actuator of said second actuated road wheel.

14. An apparatus as claimed in claim 13, further comprising a third road wheel sensor to measure an angle of a third actuated road wheel, wherein said controller is coupled to said sensor and an actuator of said third actuated road wheel.

15. An apparatus as claimed in claim 14, further comprising a fourth road wheel sensor to measure an angle of a fourth actuated road wheel, wherein said controller is coupled to said sensor and an actuator of said fourth actuated road wheel.

16. An apparatus as claimed in claim 10, wherein said controller includes a look-up table to assist in comparing the measured angle to the acceptable angle range.

17. An apparatus as claimed in claim 16, wherein the look-up table is stored in a memory bank within the controller and the comparison is performed using a processor within the controller.

* * * * *